Dec. 3, 1968   W. D. COLLIE   3,414,643
LIME FINES BRIQUETTING
Filed Aug. 19, 1965
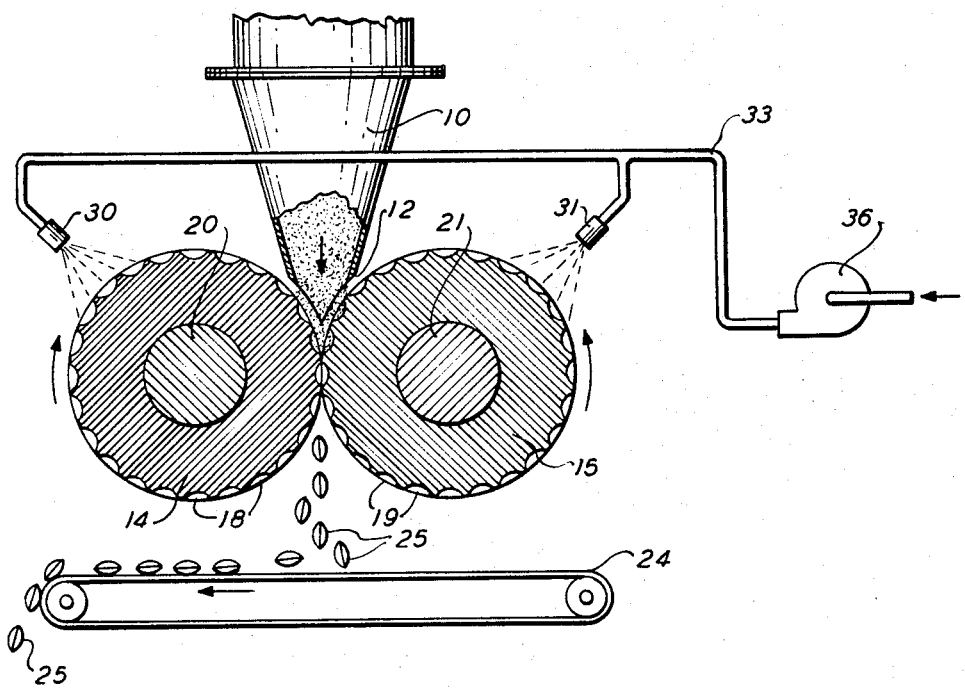
INVENTOR
WILLIAM D. COLLIE
BY
Riggs T. Stewart
ATTORNEY 3,414,643
LIME FINES BRIQUETTING
William D. Collie, Benton, Ky., assignor to Air Reduction Company, Incorporated, New York, N.Y., a corporation of New York
Filed Aug. 19, 1965, Ser. No. 480,964
5 Claims. (Cl. 264—109)

ABSTRACT OF THE DISCLOSURE

Lime fines are briquetted by introducing them into mold cavities, the surfaces of which are coated with an aqueous solution containing a polyoxyethylated alkylphenol, and compressing the fines in the mold cavities to form the fines into briquets.

---

This invention relates to the treatment of calcium oxide fines recovered in the generation of acetylene from calcium carbide, and is more particularly concerned with the treatment of such fines to produce calcium oxide in a form for subsequent conversion to calcium carbide.

Acetylene is conventionally produced by the action of water upon calcium carbide in a suitable reaction vessel commonly referred to as acetylene "generator." The calcium carbide in turn is produced commercially by fusing calcined lime, i.e. CaO, and coke in an electric arc-furnace or resistance furnace.

The preparation of calcium carbide, and the production of acetylene by the action of water upon calcium carbide are well-known industrial reactions, and are described, for example, in Kirk-Othmer, "Encyclopedia of Chemical Technology" (Second Edition), vol. 1, pp. 174–178, vol. 4, pp. 103–114.

In the acetylene regeneration operation, there is obtained, in addition to the desired acetylene, an aqueous slurry or sludge, which contains large quantities of hydrated lime, i.e. calcium hydroxide. In order to increase the efficiency of the integrated calcium carbide production-acetylene generation operations, the calcium values are recovered from the acetylene generator sludge by calcining the sludge to produce calcined lime (CaO), which can be re-used in the preparation of additional quantities of calcium carbide.

Thus, the acetylene generator sludge is centrifuged to remove the aqueous portion as much as possible, and then the solid component is dried in a conventional rotary lime kiln. The product issuing from the kiln is approximately 95% CaO and about 5% impurities, which are derived from the original calcium carbide, but which do not prevent the use of the calcined product in the preparation of further quantities of calcium carbide. However, this calcined product is produced in a finely divided form which is essentially a dust, and before it can be charged to the conventional calcium carbide furnace, it must be converted into a briquet of a size which can be conveniently handled, e.g. a briquet having a large dimension of about 1½ x ½ in. and a weight of about 12 grams. The briquet can, of course, be larger or smaller, but the dimension and weight mentioned are found to be particularly convenient. To form the briquets, the calcined lime recovered from the acetylene generator sludge is fed to a double roll briquetting machine, where the fines are fed to the pockets in the rolls and are pressed into briquets under very high pressure, e.g. a pressure of 100 tons. The briquets generally are either modified spheres or almond shaped, depending upon the design of the pockets in the rolls.

In order for the briquetting process to work, it is necessary to apply a parting or release material to the rolls. This material lubricates the surfaces of the pockets and permits the briquets to fall free from the pockets after formation. Conventionally, material such as light oil, graphite, and the like, have been used, but at best mediocre results have been obtained and the briquets frequently fail to fall from the pockets, or the briquets are poorly formed and disintegrate upon falling from the pockets, or at a later stage in being transported to the calcium carbide furnace.

It is, accordingly, an object of this invention to provide a process for forming briquets from calcined lime, particularly the calcined lime obtained by treatment of acetylene generator sludge, which produces briquets having improved characteristics.

In accordance with the invention, calcined lime briquets are produced by feeding the calcined lime to the pockets of a double roll briquetting machine, after the pockets have been coated with an aqueous solution of a surfactant which is an ethylene oxide adduct of an alkylphenol, e.g. an octylphenol or nonylphenol. Such adducts, which are also known as polyoxyethylated alkylphenols, are illustrated by the following formula

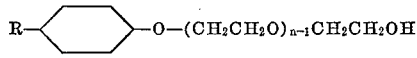

wherein R is an alkyl group containing 8–9 carbon atoms. The polyoxyethylated nonylphenols are sold commercially under the name Igepal, and the polyoxyethylated octylphenols are sold under the name Triton. They have varying solubilities in water, depending upon the number of ethylene oxide units in the molecule. For example, compounds corresponding to the above formula, wherein $n$ is from 1 to 10, have low and medium water solubility, whereas compounds wherein $n$ is above 10, have relatively high water solubility, particularly those in which $n$ is 15 and above, e.g. up to 30.

The surprising discovery has been made that when an aqueous solution of these polyoxyethylated alkylphenols, particularly those in which $n$ has an average value in the range of about 10, such as the commercial products known as Igepal CO–630, and Triton X–100, are used to coat the pockets of a briquetting machine, and calcined lime fines are then formed into briquets in these pockets, a particularly smooth operation is realized, and greatly improved briquets are produced.

Thus, not only do the briquets readily drop free from the pockets of the briquetting rolls, but it has been observed that there is less wear upon the pockets. Furthermore, it has been found that the briquets themselves have a greater density than has heretofore been obtainable with conventional parting or releasing materials, that the percentage of imperfectly formed briquets is very greatly reduced and that the briquets have greatly improved resistance to disintegration after formation and before being charged to the calcium carbide furnace. In addition, they are found to have a very smooth, hard finish. Furthermore, binders, such as are used in conventional briquetting operations, do not need to be employed.

It will, of course, be understood that the process of this invention is not limited to any specific type of briquetting machine, but it has been found to be particularly applicable to double roll briquetting machines of the type illustrated, for example, in Fisher U.S. Patent No. 1,916,-306, and Nomarek U.S. Patent No. 2,675,304. In the accompanying drawing, there is illustrated diagrammatically a typical briquetting machine of the type in which the process of this invention can be carried out. In the drawing, reference numeral 10 indicates a bin into which the calcined lime fines are charged from the lime kiln, and which feeds the lime fines through a mouth 12 into the gap or "nip" between the two rolls 14 and 15 which are formed on their surfaces with mating pockets 18 and 19, respectively, for reception of the lime fines. The two rolls are mounted upon shafts or hubs 20 and 21, respectively, which are suitably driven from any power source in conventional manner and are relatively positioned so that the desired pressure is imposed upon the fines in the pockets, also in conventional manner. Below the rolls 14 and 15 is a belt conveyor 24 upon which the briquets 25 fall and are conveyed to one end for collection and subsequent transport to the calcium carbide furnace. In conventional manner the rolls may have a single circumferentially-spaced-apart series of pockets or they may have a plurality of such series axially spaced apart so that a plurality of briquets can be formed simultaneously. Spray nozzles 30 and 31, connected to a conduit 33, are provided to spray the solution of polyoxyethylated alkylphenols upon the surfaces of the pockets 18 and 19 before the lime fines are fed to them, so that they are thoroughly coated with the solution when the lime fines come into contact with them. A pump 36 supplies the solution to the conduit which feeds the nozzles.

The solution of the polyoxyethylated alkylphenol can be of various concentrations ranging, for example, from a water-surfactant ratio of 40:1 to 100:1. However, a ratio of 75:1 has been found to be particularly convenient and effective. As previously indicated, the polyoxyethylated nonylphenol having approximately 10 ethylene oxide units to the molecule, as exemplified by the commercial product Igepal CO–630, has also been found to be particularly efficient and effective, and is preferred.

The following example of operation in accordance with this invention will serve to illustrate the advantages and features of the invention, but it is to be understood that it is to be interpreted as illustrative only.

EXAMPLE

Calcined lime fines consisting of approximately 95% CaO and having an average particle diameter of about 1/32 in. were charged to the pockets of the rolls of a briquetting machine of the construction illustrated in the drawing and were pressed under a pressure of 100 tons to form briquets weighing approximately 12 grams each in pockets having a large diameter of 1½ in. Prior to filling the pockets with the lime fines, each pocket was coated with a film of an aqueous solution of Igepal CO–630, having a water to Igepal ratio of 75:1. By spraying the solution into the pockets through a spraying assembly, as illustrated in the drawing, sufficient solution was sprayed into each pocket to form a substantially continuous film over the pocket surface.

The briquets produced fell freely from the pockets and were found to have a smooth, hard surface and a density of 189.07 lbs./cu. ft. 85% of the briquets were perfectly formed and 75% remained intact from the time they fell from the pockets until they were charged to a calcium carbide furnace after being transported a distance of more than 1500 feet by means of a belt conveyor and various elevators and charge handling equipment.

In the making of calcium carbide, the lime charge should be of at least about 95% purity but it may, of course, be up to 100% purity and occasionally may fall below 95% purity, e.g. 90%. The invention is, therefore, particularly applicable to such calcined lime and while it is of particular utility in handling lime fines of very fine particle size, it can be used with larger particles, e.g. up to ⅛ in. diameter, or even particles of larger size.

It will be understood that various changes and modifications may be made in the embodiments described above and illustrated in the drawing without departing from the scope of the invention, as defined in the appended claims. For example, this invention is not limited to lime recovered from calcium carbide operations, but can be applied to lime fines of any type, e.g. finely-divided fresh lime, or lime fines recovered in operations such as alkali manufacture, and the like.

It is intended, therefore, that all matter contained in the foregoing description and in the drawing shall be interpreted as illustrative only and not as limitative of the invention.

I claim:
1. The method of treating molds for molding lime fines to form briquets therefrom which comprises applying to the surfaces of the molds an aqueous solution consisting essentially of water and a polyoxyethylated alkylphenol prior to the introduction of the lime fines into the molds.

2. A method as defined in claim 1 wherein said polyoxyethylated alkylphenol is a polyoxyethylated nonylphenol.

3. In the method of molding lime fines to form briquets therefrom, the step of coating the surfaces of mold cavities with an aqueous solution of a polyoxyethylated alkylphenol and thereafter introducing the lime fines into the mold cavities, the ratio of water to polyoxyethylated alkylphenol in said solution being from 40:1 to 100:1.

4. A method as defined in claim 3 wherein said polyoxyethylated alkylphenol is a polyoxyethylated nonylphenol.

5. A briquet formed by molding lime fines in a mold cavity coated with an aqueous solution of a polyoxyethylated alkylphenol.

References Cited

UNITED STATES PATENTS

| 2,729,855 | 1/1956 | Titus et al. | 264—109 |
| 2,833,658 | 5/1958 | May | 106—38.24 |
| 3,075,847 | 1/1963 | Henry et al. | 106—38.22 |

ROBERT F. WHITE, *Primary Examiner.*

J. R. HALL, JR., *Assistant Examiner.*